Nov. 5, 1935.  A. W. BUCKWELL  2,019,477
TYPEWRITING MACHINE
Filed Aug. 7, 1934
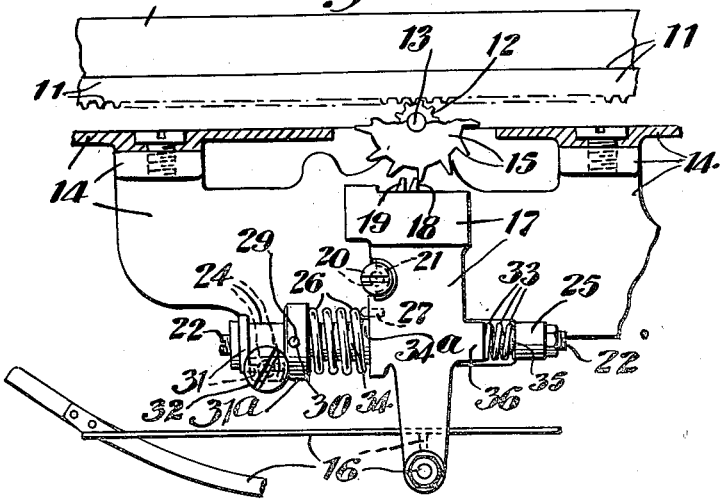
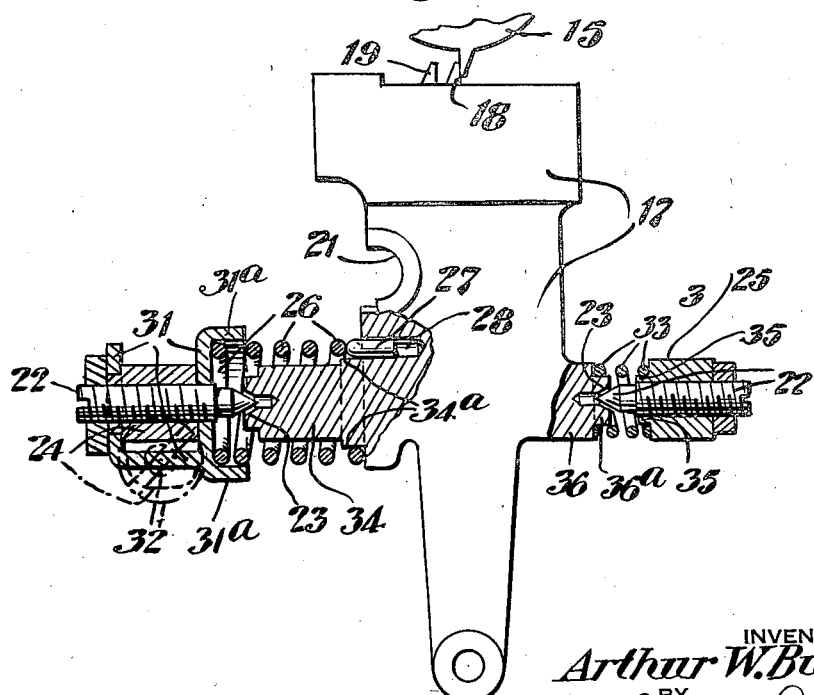
INVENTOR
Arthur W. Buckwell
BY
ATTORNEYS Patented Nov. 5, 1935

2,019,477

UNITED STATES PATENT OFFICE 2,019,477

TYPEWRITING MACHINE

Arthur W. Buckwell, Braintree, Mass., assignor to L. C. Smith & Corona Typewriters, Inc., Syracuse, N. Y., a corporation of New York Application August 7, 1934, Serial No. 738,831

12 Claims. (Cl. 197—88)

This invention relates to typewriting or like machines having a traveling platen carriage, and more particularly to carriage escapement mechanism therefor.

The principal objects of the invention are to provide an improved carriage escapement for such machines, which will operate substantially without noise, the shocks and impacts occurring in the step-by-step letter-space feeding of the carriage being cushioned and the vibrations incident thereto being absorbed or prevented from reaching the machine frame, thereby resulting in providing a substantially noiseless letter-space feed of the carriage; to provide an improved shock and vibration absorbing or dissipating mounting for the dog rocker of the escapement mechanism; and to provide a silent escapement mechanism with a minimum of changes over more noisy existing equipment, whereby the noise usually incident to operation of the escapement mechanism may be eliminated with minimum expense and with minimum change in existing machines.

To these ends, and to other ends which will hereinafter appear, the invention consists in the combinations of devices, features of construction, and arrangements of parts pointed out in the appended claims and set forth in the following description of the preferred embodiment of the invention illustrated in the accompanying drawing.

In the drawing, Fig. 1 is a fragmentary rear elevation of the improved escapement mechanism embodied in an L. C. Smith typewriting machine; and Fig. 2 is an enlarged fragmentary rear elevation of the escapement mechanism, with parts in section, showing more clearly certain features of the invention.

Only so much of the known L. C. Smith typewriting machine is shown in the drawing and will be described as is necessary to illustrate the invention in its preferred embodiment in said machine. In this known machine the platen carriage, a part of which is shown at 10, travels transversely of the machine, being supported for such movement upon the main frame 14 of the machine on suitable bearings (not shown), and being spring-impelled in the known manner in the direction of its step-by-step letter-space feed movement, which direction of movement is from left to right as the machine is viewed from the rear as in Figs. 1 and 2. The straight rack 11 is held to the carriage to travel therewith, and meshes with the feed pinion 12. Pinion 12 is fixed on the forward end of a shaft 13, which shaft is journalled in a suitable bearing on the main frame and has fixed on its rear end the toothed element or escapement wheel 15.

The universal bar device 16 of the known machine is moved rearwardly on the down strokes of the type keys and space bar of the machine and forwardly on the return or up strokes in the usual manner, and is fastened in the usual manner to the lower end of the dog rocker 17 to rock the latter to cause the usual stepping dog 18 and holding dog 19 carried by the rocker to co-act alternatively in the known way with the teeth of the escapement wheel to feed the carriage step-by-step in letter-space-feed direction. The stepping dog is normally engaged with the wheel and the holding dog is normally disengaged from the wheel, return movement of the dog rocker on the up strokes of the keys being arrested by the head of usual dog rocker stop bolt 20, which bolt is held to the main frame, the shank of this bolt (as shown in dotted lines in Fig. 1) passing through, but being spaced from the edge of, a recess 21 in the dog rocker.

In the known machine the dog rocker 17 oscillates in a fixed plane about a fixed axis, the conoidal inner ends of two pivot screws 22 fitting in and contacting the walls of conoidal bearing sockets 23 on the dog rocker, said screws being threaded through two rearwardly projecting arms 24 and 25 formed on the main frame. Also, in the known machine, a coiled return spring 26 is provided for the dog rocker, said return spring having one end portion 27 anchored in a socket 28 in the dog rocker and an end portion 29 anchored in an aperture 30 in the cup-like inner end portion 31ª of a spring-tension-adjusting yoke 31 which is pivoted on arm 24 and has its transversely extending portion engaged by the forward end of a spring-tension-adjusting screw 32 which is threaded through the downwardly extending rear end portion of arm 24.

The escapement mechanism as above described of the known machine is constructed substantially as shown in the patent to Gabrielson, No. 864,890, granted September 3, 1907, and further description of the known machine and its escapement is unnecessary.

According to the present invention the dog rocker is supported not only for rocking movement but for a positively limited universal floating movement in such manner as to absorb, cushion or dissipate the shocks or impacts incident to engagement of the teeth of wheel 15 with the dogs 18 and 19 in letter-space feeding of the carriage, the noise-producing vibrations resulting from such shocks or impacts being absorbed or dissipated and prevented from reaching the main frame 14 of the machine, thereby affording substantially noiseless operation of the escapement.

In the improved construction, the dog rocker 17, instead of being supported and pivoted on the screws 22 for its rocking movement, is supported for its rocking movement by the coiled spring 26 (which also functions as before, as the return spring for the dog rocker) and by an opposed coil spring 33.

The outermost coil of spring 26 fits in the cup portion 31ᵃ of yoke 31, which yoke, by its engagements with the outer coil of spring 26 and end portion 29 of the spring, supports said spring at the outer end of the spring. The innermost coil of spring 26, to support the rocker, fits about an enlarged inner end portion 34ᵃ of the adjacent hub portion 34 of the dog rocker, about which hub the intermediate portion of the spring is coiled in spaced relation with the main portion of the hub. The outer end of spring 33 is supported on arm 25 by the fitting of its outermost coil about a cylindrical boss or inwardly projecting arm portion 35 formed on arm 25, and the innermost coil of spring 33 fits about a cylindrical boss or reduced outer end portion 36ᵃ of the adjacent hub portion 36 of the dog rocker. The two hubs 34 and 36 are directly opposed with their axes in alignment, as are also the two screws 22.

The two opposed coil springs normally hold the dog rocker balanced therebetween with the conoidal inner ends of both screws 22 out of contact with the walls of the conoidal sockets 23 in the dog rocker hubs. The adjustment of screws 22 is such that while they permit a limited universal floating movement of the spring-supported dog rocker their inner ends are not spaced far enough apart to permit the dog rocker to shift out from between the screws, said screws serving to positively limit the extent of floating movement of the dog rocker in all directions. These screws prevent such movement of the dog rocker as would disconnect its supporting springs from the rocker and the frame, and also serve to limit movement of the dog rocker under excessive sidewise thrusts and when the machine is turned upon either side or either end. A universally yieldable or flexible pivotal or rocking mounting is thus provided for the dog rocker, the dog rocker having a floating axis.

The spring mounting for the rocker normally holds the rocker positioned as shown in the drawing. The opposed springs cushion the shocks of impact of the teeth of the wheel 15 on the dogs 18 and 19 and almost instantly stop vibration of the rocker after such impacts, so that such shocks and the vibrations incident thereto are absorbed and prevented from reaching the machine frame. Substantially all noise ordinarily incident to operation of an escapement is thus eliminated.

What I claim is:

1. In a typewriting or like machine having a frame upon which a carriage travels, a carriage escapement comprising a dog rocker, means supporting the dog rocker on the frame for rocking about a universally floating axis to feed the carriage step-by-step, and means for positively limiting floating movements of the dog rocker in all directions relatively to the frame.

2. A carriage escapement comprising a toothed element, a dog rocker carrying dogs co-active with said element to feed a carriage step-by-step as the rocker is rocked, and means supporting said rocker for rocking movement and yieldably sustaining the rocker for universal floating of the rocker axis.

3. A carriage escapement comprising a toothed element, a dog rocker carrying dogs co-active with said element to feed a carriage step-by-step as the rocker is rocked, means yieldably supporting the rocker for rocking movement about a universally floating axis, and means for positively limiting the universal floating movement of the rocker permitted by said first-mentioned means.

4. A carriage escapement comprising a dog rocker, a dog rocker support, and a pair of opposed coiled springs connected at their inner ends with said rocker at opposite sides of the rocker and connected at their outer ends with said support to yieldably and pivotally support the rocker.

5. A carriage escapement comprising a dog rocker, a support, and a pair of coiled springs opposed end to end and holding the rocker balanced therebetween, said springs being connected to the rocker and the support to yieldably and pivotally sustain the rocker.

6. In a typewriting or like machine having a frame and a traveling carriage, a carriage escapement for feeding the carriage in one direction comprising a toothed element which moves when the carriage travels in said one direction, a dog rocker carrying dogs co-active with said element to feed the carriage step-by-step in said one direction, and a pair of coiled springs opposed end to end and supporting said rocker with their inner ends and being themselves supported at their outer ends on the frame, said springs flexibly and pivotally supporting the rocker.

7. In a typewriting or like machine having a frame and a traveling carriage, a carriage escapement for feeding the carriage in one direction comprising a toothed element which moves when the carriage travels in said one direction, a dog rocker carrying dogs co-active with said element to feed the carriage step-by-step in said one direction, a pair of coiled springs opposed end to end and supporting said rocker with their inner ends and being themselves supported at their outer ends on the frame, said springs flexibly and pivotally supporting the rocker, and means on the frame co-active with the rocker to positively limit movement of the rocker longitudinally and transversely of its pivotal axis.

8. In a typewriting or like machine having a frame and a traveling carriage, a carriage escapement for feeding the carriage in one direction comprising a toothed element which moves when the carriage travels in said direction, a dog rocker carrying dogs co-active with said element to feed the carriage step-by-step in said one direction, said rocker having opposed axially aligned sockets thereon, a pair of opposed rigid elements on the frame extending into said sockets, and a pair of endwisely opposed coil springs co-axial with said sockets and connected with the rocker and frame to yieldingly and pivotally support the rocker from the frame, said springs normally holding the rocker balanced between their adjacent ends with the walls of said sockets in the rocker out of contact with said opposed rigid elements on the frame.

9. In a typewriting or like machine having a frame and a traveling carriage, a carriage escapement for feeding the carriage in one direction comprising a toothed element which moves when the carriage travels in said direction, a dog rocker carrying dogs co-active with said element to feed the carriage step-by-step in said one direction, said rocker having opposed axially aligned sockets thereon, a pair of opposed rigid elements on the frame extending into said sockets, a pair of endwisely opposed coil springs coaxial with said sockets and connected with the rocker and frame to yieldingly and pivotally support the rocker from the frame, said springs normally holding the rocker balanced between their adjacent ends with the walls of said sockets in the rocker out of contact with said opposed rigid elements on the frame, and a stop on the frame for determining the normal rocked position of the rocker, one of said springs being connected at its ends with the frame and rocker to normally rock the rocker against said stop.

10. In a typewriting or like machine having a frame and a traveling carriage, a carriage escapement for feeding the carriage in one direction comprising a toothed element which moves when the carriage travels in said one direction, a dog rocker carrying dogs co-active with said element to feed the carriage step-by-step in said one direction, a pair of coiled springs opposed end to end and supporting said rocker with their inner ends and being themselves supported at their outer ends on the frame, said springs flexibly and pivotally supporting the rocker, and one of said springs being connected at its ends to the frame and rocker to rock the rocker in one direction, and a dog rocker return stop on the frame for limiting rocking movement of the rocker by said last-mentioned spring.

11. In a typewriting or like machine having a frame and a traveling carriage, a carriage escapement for feeding the carriage in one direction comprising a toothed element which moves when the carriage travels in said one direction, a dog rocker carrying dogs co-active with said element to feed the carriage step-by-step in said one direction, a pair of coiled springs opposed end to end and supporting said rocker with their inner ends and being themselves supported at their outer ends on the frame, said springs flexibly and pivotally supporting the rocker, one of said springs being connected at its ends to the frame and rocker to rock the rocker in one direction, a dog rocker return stop on the frame for limiting rocking movement of the rocker by said last-mentioned spring, and adjustable means for varying the tension of said last-mentioned spring.

12. In a typewriting or like machine, the combination with the frame of the machine of an escapement dog rocker, and pivot means at opposite sides of the rocker supporting the rocker from the frame to shift axially under shocks, one of said pivot means comprising a coiled dog rocker return spring connected at its ends to the frame and rocker to pivotally support the rocker and to yieldingly resist axial movement of the rocker in one direction and to normally rock the rocker in the direction of return rocking motion of the rocker.

ARTHUR W. BUCKWELL.